(12) United States Patent
Böhringer et al.

(10) Patent No.: US 8,266,726 B2
(45) Date of Patent: Sep. 18, 2012

(54) ADSORPTION FILTER MATERIAL, PARTICULARLY FOR PRODUCING ABC PROTECTIVE CLOTHING HAVING IMPROVED WEARING PHYSIOLOGY

(76) Inventors: Bertram Böhringer, Wuppertal (DE); Anna Varga-Molnar, Mönchengladbach (DE)

( * ) Notice: Subject to any disclaimer, the term of this patent is extended or adjusted under 35 U.S.C. 154(b) by 201 days.

(21) Appl. No.: 12/597,856

(22) PCT Filed: Mar. 18, 2008

(86) PCT No.: PCT/EP2008/002125
§ 371 (c)(1),
(2), (4) Date: May 3, 2010

(87) PCT Pub. No.: WO2008/135114
PCT Pub. Date: Nov. 13, 2008

(65) Prior Publication Data
US 2010/0212071 A1    Aug. 26, 2010

(30) Foreign Application Priority Data

Apr. 27, 2007 (DE) .......... 10 2007 020 412
Jun. 6, 2007 (DE) .......... 10 2007 026 340

(51) Int. Cl.
*A41D 13/02* (2006.01)
(52) U.S. Cl. .......... 2/457
(58) Field of Classification Search .......... 2/455, 456, 2/457; 442/121, 122, 123, 131, 132, 133, 442/265, 267
See application file for complete search history.

(56) References Cited

U.S. PATENT DOCUMENTS

| | | | | |
|---|---|---|---|---|
| 4,217,386 A | * | 8/1980 | Arons et al. | 428/198 |
| 4,869,947 A | * | 9/1989 | Kirayoglu | 428/198 |
| 5,334,436 A | * | 8/1994 | Hobbs et al. | 428/195.1 |
| 6,139,929 A | | 10/2000 | Hayton | |
| 6,571,397 B1 | | 6/2003 | Williams | |
| 7,451,497 B2 | * | 11/2008 | von Blucher | 2/161.6 |
| 7,700,501 B2 | * | 4/2010 | Bohringer et al. | 442/123 |
| 7,877,819 B2 | * | 2/2011 | von Blucher et al. | 2/69 |
| 2003/0229936 A1 | | 12/2003 | Tremblay-Lutter et al. | |
| 2004/0237790 A1 | * | 12/2004 | von Blucher et al. | 96/154 |
| 2005/0076541 A1 | * | 4/2005 | von Blucher | 36/113 |
| 2007/0059504 A1 | * | 3/2007 | von Blucher | 428/220 |
| 2007/0134483 A1 | * | 6/2007 | Bohringer et al. | 428/297.4 |
| 2007/0181001 A1 | * | 8/2007 | Bohringer et al. | 96/154 |
| 2010/0212071 A1 | * | 8/2010 | Bohringer et al. | 2/400 |
| 2011/0113538 A1 | * | 5/2011 | von Blucher et al. | 2/456 |

FOREIGN PATENT DOCUMENTS
EP    0 525 409 A    2/1993

* cited by examiner

Primary Examiner — Danny Worrell
(74) Attorney, Agent, or Firm — Brannon Robinson PC

(57) ABSTRACT

Described is an adsorption filter material, in particular for NBC protective apparel, preferably for wearing next to the skin, in particular as an undergarment (underwear), wherein the adsorption filter material has a multilayered construction, wherein the multilayered construction comprises a first textile sheet material, a second textile sheet material and an adsorption layer disposed between the first and the second textile sheet materials, wherein the adsorption layer includes discrete, in particular grain-shaped, preferably sphere-shaped, sorbent particles, preferably based on activated carbon, adsorbing chemical and/or biological poison and noxiant materials, in particular warfare agents. The adsorption filter material is characterized in that the first textile sheet material and the second textile sheet material are each adapted to be elastic in at least one direction, preferably in both directions, and/or in that the first textile sheet material and the second textile sheet material have at least essentially the same elasticity properties. The adsorption material combines a high wearing comfort with excellent protection with regard to chemical poisons.

13 Claims, 1 Drawing Sheet

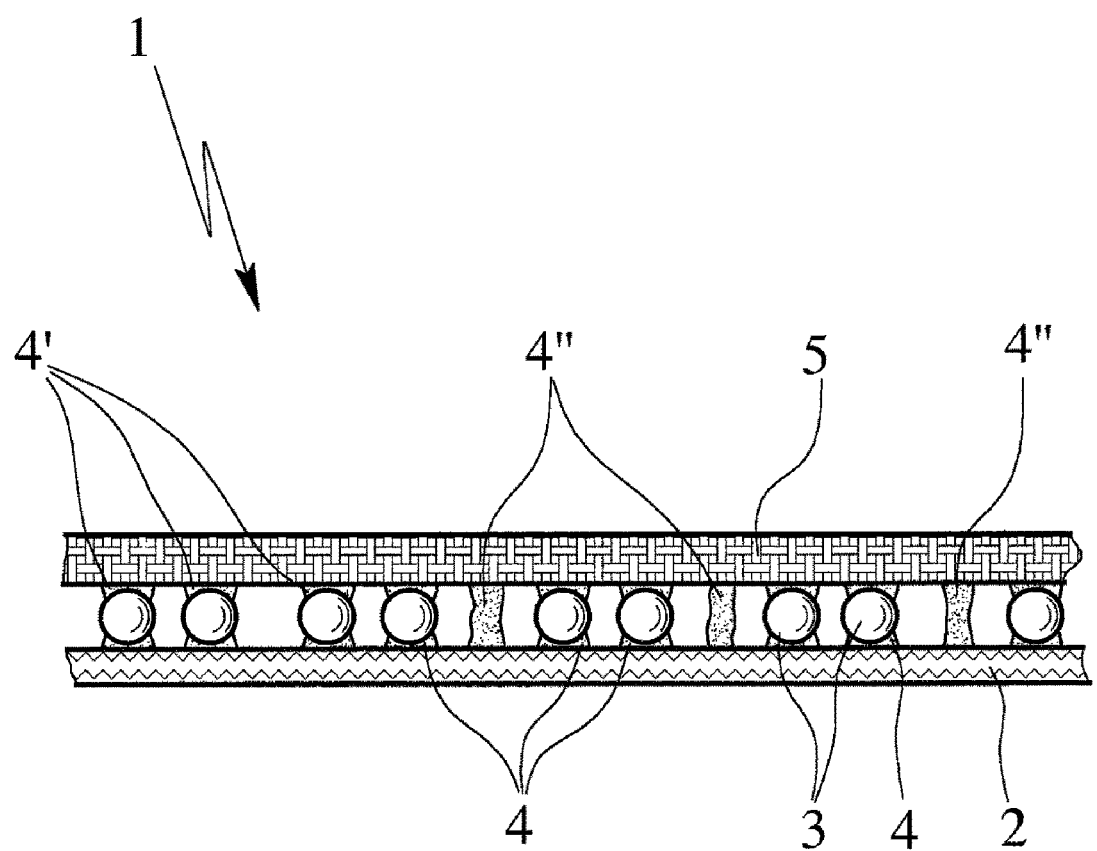

US 8,266,726 B2

ADSORPTION FILTER MATERIAL, PARTICULARLY FOR PRODUCING ABC PROTECTIVE CLOTHING HAVING IMPROVED WEARING PHYSIOLOGY

CROSS-REFERENCES TO RELATED APPLICATIONS

This application is a National Stage filing of International Application PCT/EP2008/002125, filed Mar. 18, 2008, claiming priority to German Application Nos. DE 10 2007 020 412.6 filed Apr. 27, 2007 and DE 10 2007 026 340.8 filed Jun. 6, 2007. The subject application claims priority to PCT/EP2008/002125 and to German Application Nos. DE 10 2007 020 412.6 and DE 10 2007 026 340.8 and incorporates all by reference herein, in their entirety.

BACKGROUND OF THE INVENTION

The present invention relates to a multilayered absorption filter material providing a protective function to chemical poisons, in particular chemical warfare agents, in particular for NBC protective apparel, preferably for wearing next to the skin, in particular as an undergarment (underwear). The present invention further relates to a garment, in particular NBC protective apparel, preferably for wearing next to the skin, utilizing Applicants' absorption filter material. Finally, the present invention relates to the use of the adsorption filter material to manufacture garments (particularly for wearing next to the skin, such as for example, underwear) that function as NBC protective apparel.

There are a number of materials which are absorbed by the skirt and lead to severe physical noxiae. Examples include the vesicatory mustard gas Yellow Cross (Hd) and the nerve gas sarin. People likely to come into contact with such poisons must wear a suitable protective suit, or be protected against these poisons by suitable protective materials.

In principle, protective suits are known in this regard in the prior art which are worn in the form of an overgarment as outermost apparel layer. Air and water vapor pervious protective suits and impermeable systems are known in this regard. The concept of wearing the protective suit in the manner of an overgarment, however, has the disadvantage that such protective suits are often only put on in the alarm scenario, i.e., in the event of an acutely threatening confrontation with chemical or biological poison or warfare agent materials. If such protective suits cannot be put on or donned in time, for example under severe stress situations, the danger of a corresponding poisoning is very high. In addition, such protective suits do not always offer optimum wearing comfort, since they are occasionally heavy, inflexible and in some instances only minimally breathable.

There are also prior art protective apparel systems designed in the form of an undergarment (underwear). Such systems have in principle the advantage that they are worn on the body permanently, throughout the entire period of deployment and beyond, and are thus able to offer continuous protection against chemical or biological poison or warfare agent materials.

However, the prior art protective apparel systems which are used or worn in the form of underwear are not always optimal, in particular with regard to their wearing comfort but also in relation to their protective properties. For instance, US 2003/0229936 A1 and the corresponding patent family member CA 2 390 629 A1 concern a very thin, stretchable protective apparel in the form of an undergarment which is worn next to the skin and which offers protective properties in relation to chemical vapors and gases. The material described in this patent family is very thin at a thickness of less than 1 mm, so that optimal protective performance is not always ensured in extreme situations in particular, particularly since the material has a relatively low breaking strength and therefore does not possess optimum mechanical stability. In addition, there is a proposal in accordance with this patent family that the adsorption filter material either be incorporated in the fabric structure, i.e., that the fabric be impregnated with the adsorbents, or used in the form of a knit material based on carbon fibers. Particularly due to the physical properties of the carbon fibers, only low stretchability will inevitably result for the material—coupled with a worsened wearing comfort.

BRIEF SUMMARY OF THE INVENTION

Against this background, then, the present invention has for its object to provide an adsorption filter or protective material which at least partly avoids or at least reduces the above-described disadvantages of the prior art in that the adsorption filter material shall be useful in particular in the manufacture of protective apparel, in particular NBC protective apparel, preferably for wearing next to the skin.

The present invention further has for its object to provide an adsorption filter material, in particular for use for NBC protective apparel, in particular for wearing next to the skin, that combines good protective performance with regard to chemical or biological poison or warfare agent materials with high stretchability or elasticity and therefore is useful in the manufacture of garments where a perfect fit and hence a high wearing comfort is ensured.

The present invention further has for its object to provide an adsorption filter material, in particular for use in NBC protective apparel, and in particular for wearing next to the skin, that combines high physical and chemical resistance with a high degree of air perviousness.

This object is achieved as proposed by an adsorption filter material, utilized for constructing an NBC protective apparel, suitable for wearing next to the skin, in particular as an undergarment (underwear). The adsorption filter material has a multilayered construction, including a first textile sheet material, a second textile sheet material and an adsorption layer disposed between the first and the second textile sheet materials. The adsorption layer includes discrete, in particular grain-shaped, preferably sphere-shaped, sorbent particles. The adsorbent particles are preferably based on activated carbon, adsorbing chemical and/or biological poison and noxiant materials, in particular warfare agents. With regard to the textile sheets, the first textile sheet material and the second textile sheet material are each constructed to be elastic in at least one direction, preferably in both directions, and/or with both textile sheets having at least essentially the same elasticity properties.

The above object is further achieved by a garment, in the form of an NBC protective apparel constructed from the adsorption filter material disclosed and claimed, Preferred garments are for wearing next to the skin, in particular as an undergarment (underwear). This claimed garment is constructed as described herein.

The object of the present invention is finally achieved by the use of an adsorption filter material in the manufacture of garments, in particular NBC protective apparel, preferably for wearing next to the skin, in particular as an undergarment (underwear).

Preferred adsorption filter materials are air pervious and are formed from air pervious textile sheets. For the preferred adsorption materials, the adsorbent particles are secured to at least one of the air pervious textile sheets with an adhesive that is applied discontinuously to at least one of the textile sheets causing one of the textile sheets to be firmly bound to the adsorbent and the other textile sheet. The preferred adsorption filter material has an elastic stretch of at least 10% at 20N, based on the adsorption filter material.

Further, advantageous developments and adaptations are described below and form the subject matter of Applicants' claims.

BRIEF DESCRIPTION OF THE DRAWINGS

FIG. 1 shows a schematic sectional depiction of a preferred embodiment of the present invention illustrating the layered construction of an inventive adsorption filter material.

DETAILED DESCRIPTION OF THE INVENTION

The present invention accordingly provides—in accordance with a first aspect of the present invention—an adsorption filter material, in particular for NBC protective apparel, preferably for wearing next to the skin, in particular as an undergarment (underwear), wherein the adsorption filter material has a multilayered construction, wherein the multilayered construction comprises a first textile sheet material, a second textile sheet material and an adsorption layer disposed between the first and the second textile sheet materials, wherein the adsorption layer includes discrete, in particular grain-shaped, preferably sphere-shaped, sorbent particles, preferably based on activated carbon, adsorbing chemical and/or biological poison and noxiant materials, in particular warfare agents, wherein the first textile sheet material and the second textile sheet material are each constructed to be elastic in at least one direction, preferably in both directions, and/or in that the first textile sheet material and the second textile sheet material have at least essentially the same elasticity properties.

One fundamental idea of the present invention is accordingly that the adsorption filter material of the present invention be constructed such that the first textile sheet material and the second textile sheet material have a reversible stretchability or elasticity, in each case in at least one direction, preferably in both directions, in particular as hereinbelow defined, and that the first textile sheet material and the second textile sheet material have at least essentially the same elasticity properties, since this ensures in particular that the adsorption filter material of the present invention has excellent elasticity or stretch properties, which appreciably improves the wearing comfort.

Owing to the high elasticity of the adsorption filter material of the present invention, protective apparels manufactured from or with the adsorption filter material of the present invention can conform particularly well to the body or to the body shape, so that such protective apparels abut the skin particularly well or closely. This results in a particularly high wearing comfort. This is because owing to the close or direct abutment of the protective apparel produced with the adsorption filter material of the present invention, wearing physiology is distinctly improved, in particular since creasing or scuffing or rubbing of the protective apparel is suppressed in an effective manner. In addition, the protective apparel produced with the adsorption filter material of the present invention can be worn as a "second skin" as it were, so that the protective apparel does not significantly affect the wearing of overgarments.

The specific use of discrete sorbent particles results moreover in a high protective performance with regard to chemical or biological poison and noxiant materials under high mechanical stress, since such particles remain on the carrier material or between the carrier plies, and are not detached, under high (stretching) stress.

The high elasticity of the adsorption filter material of the present invention also has the effect of minimizing the formation of intermediate spaces between the protective apparel on the one hand and the body surface or skin on the other. Owing to the close or tight fit to the skin of the protective apparel manufactured from the adsorption filter material of the present invention, the bellows or bellowing effect is thus prevented or minimized, so that physical movement in particular does not lead to an excessive air exchange between the protective apparel and the wearer and so any additional influx of toxic substances is prevented. Owing to the high stretchability, the protective suits manufactured from the adsorption filter material of the present invention fit snugly and comfortably on the body even at joints under strong physical movement.

The term "undergarment", used interchangeably with underwear and underapparel, is to be understood as referring in this context to all kinds of underwear which are preferably worn next to the skin. The underwear or underapparel in question can be present in the form of a protective apparel, particular an NBC protective apparel. In this regard, the adsorption filter material of the present invention can be processed by way of example and non-limitingly into whole body protective apparel, for example in the form of an overall or coverall. At the same time, however, the adsorption filter material of the present invention can be processed into (under)shirts, (under)pants, socks, (under)gloves, caps, hoods or the like.

The elastic construction of the textile sheet material and hence of the adsorption filter material as a whole is to be understood as a reversible stretchability in particular. In other words, the adsorption filter material of the present invention, or the first textile sheet material and the second textile sheet material, experience under the action of a force, for example under the action of a tensile force, a defined change in length and area respectively, and after the action of the force has been removed the original length and original area respectively before the action of the force is at least essentially attained again owing to the inherent resiling force of the material. In this regard, the phrase "in at least one direction" in relation to the elastic construction is to be understood as meaning that the textile sheet materials are constructed to be elastic in the longitudinal and/or transverse directions. In the realm of a specific embodiment whereby the first textile sheet material and/or the second textile sheet material are constructed in the form of a woven fabric, the elasticity thus relates to the warp and/or weft directions of the sheet material. When the material is stretchable in one direction at least, this is also referred to synonymously as a monoelastic sheet material. When elasticity is present in relation to longitudinal and transverse directions, this is also referred to synonymously as a bi-elastic sheet material. It is preferred for the purposes of the present invention for the first textile sheet material and the second textile sheet material each to be constructed to be elastic in both directions, i.e., in the longitudinal and transverse directions, the elasticity not only of the first textile sheet material but also of the second textile sheet material advantageously being essentially the same in both directions and the relative deviation in this regard being at most. 50% (relative), preferably at most 30% (relative) and more preferably at most 10% (relative), based on the elasticity of one of the two textile sheet materials. When, for example, the elasticity of the first textile sheet material in a first direction (for example longitudinal or warp direction) is 30%, based on the original dimension, the elasticity thereof, i.e., of the first textile sheet material, in the other, second direction (e.g., transverse or weft direction) should thus be in absolute terms 30±15%, preferably 30±9% and more preferably 30±3%.

It is of particular advantage when the first textile sheet material and the second textile sheet material have at least essentially the same elasticity properties, i.e., when the elasticity properties and the stretchability of the first textile sheet material and of the second textile sheet material are/is at least essentially identical. Advantageously, the elasticity or stretchability of the first textile sheet material on the one hand and of the second textile sheet material on the other (i.e., compared to each other) should deviate from each other by at most 30% (relative), preferably at most 20% (relative) and most preferably at most 5% (relative), based on the elasticity values and, in particular, based on one direction, preferably both directions (i.e., trans-verse and longitudinal directions or, in the case of wovens etc, warp and weft directions). When, for example, the elasticity of the first textile sheet material in one direction (for example in the longitudinal or warp direction) is 40% based on the original dimension, the elasticity of the second textile sheet material in the same direction should accordingly deviate by at most 30% in relative terms, i.e., thus in absolute terms be 40±12%, preferably deviate by 20% in relative terms, i.e., preferably be 40±8% in absolute terms, and most preferably deviate by 10% in relative terms, i.e., thus be most preferably 40±4% in absolute terms. The aforementioned deviation percentages are thus to be understood as relative percentages based on the elasticity which thus indicate the relative deviation in elasticity or relative stretchability.

The first textile sheet material may in the realm of the present invention be that sheet material which in the donned state of the adsorption filter material of the present invention, or of the protective materials manufactured therefrom, is in direct contact with the skin of the wearer. The first textile sheet material thus constitutes the inner layer of the adsorption filter material, while the second textile sheet material in the donned state is on that side which is remote from the skin of the wearer and thus constitutes the outer layer as it were.

It is particularly advantageous when the first textile sheet material and/or the second textile sheet material are constructed to be gas pervious, in particular air pervious, and/or water vapor pervious. In this way, the wearing comfort provided by the adsorption filter material of the present invention can be further improved, since for example perspiration and/or water vapor can be effectively transported away from the body of the wearer.

It is further particularly advantageous when the first textile sheet material and/or the second textile sheet material are constructed as wovens, knits, laid scrims or bonded fabrics, in particular nonwovens. In accordance with an embodiment which is preferred according to the present invention, the first textile sheet material and/or the second textile sheet material are constructed as knit fabric. In this regard, it is possible in the realm of the present invention for the first textile sheet material to have the same structure as the second textile sheet material. It is similarly possible, however, for the first textile sheet material to have a different structure than the second textile sheet material. It may be provided for example, in a non-limiting mantier, for the first textile sheet material to be constructed as a formed-loop knit, while the second textile sheet material is a woven fabric.

To achieve a low basis weight for the adsorption filter material according to the invention, which further improves the wearing comfort offered by the adsorption filter material of the present invention, the first textile sheet material and/or the second textile sheet material should have a basis weight of 70 to 180 g/m², in particular 90 to 130 g/m², in particular wherein the first textile sheet material and the second textile sheet material should have at least essentially identical basis weights. However, it can also be provided in accordance with the present invention for the first textile sheet material to have a different basis weight than the second textile sheet material. For example, the second textile sheet material may as a thin covering layer have a lower basis weight than the first textile sheet material.

The first textile sheet material and/or the second textile sheet material may in accordance with an embodiment which is particularly preferred according to the present invention comprise a mixture of at least two different fiber varieties, in which case the first textile sheet material and/or the second textile sheet material comprise at least one elastic and/or reversibly stretchable fiber variety. The use of at least one elastic or reversibly stretchable fiber variety has the result that the elasticity behavior of the first textile sheet material and of the second textile sheet material and hence of the adsorption filter material as a whole is significantly improved. As to the incorporation of the elastic or reversibly stretchable fiber variety or of the mixture with at least one different fiber variety and the processing to appropriate textile structures, such as wovens, knits and the like, these are well-known to a person skilled in the art, so that no further exposition is required in this regard.

The elastic or reversibly stretchable fiber variety should be physically and/or chemically stable, in particular wherein the elastic or reversibly stretchable fiber variety should be thermally stable and/or chemically stable and/or resistant to ultraviolet (UV) radiation and/or xenon light. The use of such fiber varieties can ensure that the adsorption filter material of the present invention as such has as a whole improved properties with regard to chemical stability and with regard to the effect of physical influences, so that a very durable and resistance-capable adsorption filter material can be provided according to the invention.

The elastic or reversibly stretchable fiber variety should be a fiber variety other than polyurethane fibers. This is because, as the applicant has found, polyurethane fibers are in particular owing to their poor chemical stability and their not always optimal elasticity properties not suitable for use in the realm of the adsorption filter material of the present invention. On the contrary, the elastic and/or reversibly stretchable fiber variety should be an elastic, in particular (transversely) crosslinked polyolefin fiber, preferably an elastic, in particular (transversely) crosslinked polyethylene or polypropylene fiber or an elastic polyamide fiber or an elastic polyester fiber. Preferably, the elastic and/or reversibly stretchable fiber variety is an elastic, in particular (transversely) crosslinked polyolefin fiber, preferably an elastic, in particular (transversely) crosslinked polyethylene or polypropylene fiber. This is because the applicant has found in this regard that such fiber varieties have excellent elasticity properties and also good stability to chemical and/or physical influences.

In this regard, it is accordingly preferred according to the present invention for the elastic or reversibly stretchable fiber variety to be polyolefin based. It is further preferred for the elastic or reversibly stretchable fiber variety to be a fiber based on an ethylene-olefin copolymer.

The elastic or reversibly stretchable fiber variety should—in accordance with an embodiment which is preferred according to the present invention—be a fiber based on a low-crystallinity polyolefin, in particular a low-crystallinity ethylene-olefin copolymer. In this regard, the low-crystallinity polyolefin or the low-crystallinity ethylene-olefin copolymer should include crystallites or network-forming covalent bonds. The crystallites preferably comprise thermally reversible connections which in particular provide mechanical strength and elasticity to the polymer below its melting point. The covalent bonds also ensure the integrity of the polymer at high temperatures. Altogether, it is thus the case that a basis of crystallites or network-forming covalent bonds is used to ensure a high-elasticity network structure in relation to the polymer, and this leads to particularly good elasticity properties.

To ensure an optimum network structure, the polyolefin, in particular the ethylene-olefin copolymer, should have a crystallinity of at most 20%, based on the polymer, in particular since such values of at most 20% ensure optimum elasticity properties over a wide temperature range.

In accordance with an embodiment which is particularly preferred according to the present invention, the elastic or reversibly stretchable fibers used comprise DOW XLA® fibers, which are commercially available from The Dow Chemical Company (DOW), Midland, Mich. DOW XLA® fibers comprise an ethylene-olefin copolymer having low crystallinity and flexible polymer chains which are connected by the aforementioned crystallites and covalent bonds to form an altogether elastic molecular network. The aforementioned elastic or reversibly stretchable fiber varieties, in particular the DOW XLA® fibers, are obtainable for example by melt spinning, in particular with subsequent crosslinking, in which case mono- or muitifilamentous fibers are obtainable. The aforementioned fibers are useful in particular for blending with other fiber varieties, as are more particularly described hereinbelow.

The use of DOW XLA® fibers is also advantageous because these fibers have an extremely high resistance to chemicals, such as alkaline substances, acids or oxidizing compositions, such as sodium hypochlorite. In addition, such fibers are near insoluble in a large number of solvents.

The first textile sheet material and/or the second textile sheet material may include the elastic or reversibly stretchable fiber variety in an amount of 5% to 30% by weight, in particular 7% to 25% by weight, preferably 8% to 20% by weight, based on the respective textile sheet material, This ensures in particular that the textile sheet materials and thus the adsorption filter material as a whole have not only the positive properties of the elastic or reversible fiber variety but also the properties of the different fiber variety, in particular as described hereinbelow. Thus, the adsorption filter material of the present invention may, for example and non-limitingly, have elastic properties due to the presence of the elastic or reversibly stretchable fiber variety coupled with good haptics or skin friendliness, as ensured by the presence of cotton fibers for example.

Thus—in a manner which is preferred according to the present invention—the first textile sheet material and/or the second textile sheet material may as well as the above-described elastic or reversibly stretchable fiber variety include at least one further fiber variety, in particular textile fibers.

It can be provided in this regard that the further fiber variety, which is present in admixture with the elastic and/or reversibly stretchable fiber variety, comprises natural fibers, preferably cotton fibers (CO) and/or manufactured fibers, preferably synthetic fibers, in particular selected from the group consisting of polyester (PES), polyolefins, in particular polyethylene (PE) and/or polypropylene (PP), polyvinyl chloride (CLF), polyvinylidene chloride (CLF), acetate (CA), triacetate (CTA), polyacrylic (PAN), polyamide (PA), in particular aromatic, preferably flame-resistant polyamides (for example NOMEX®), polyvinyl alcohol (PVAL), polyurethanes, polyvinyl esters, (meth)acrylates, and also mixtures thereof, preferably polyamide (PA). The aforementioned codes for the textile fibers come from German standard specification DIN 60001-4 (August 1991).

For further details concerning the concept of textile fibers, reference may be made for example to Römpp Chemielexikon, Georg Thieme Verlag Stuttgart/New York, volume 6, 1999, pages 4477 to 4479, headword: "Textilfasern", whose entire disclosure content, including the references cited therein, is hereby incorporated herein by reference. In particular, the term textile fibers is herein to be understood as a collective designation for all fibers capable of being subjected to textile processing; a feature common to textile fibers is a considerable length in relation to their cross section and also sufficient strength and flexibility, although textile fibers can be assigned to different groups according to origin and material constitution.

It can be provided according to the present invention that the first textile sheet material and the second textile sheet material each include different further fiber varieties, in particular textile fibers, based on variety and/or amount of the further fiber varieties. It can also be provided that the first sheet material and the second sheet material include identical elastic or reversibly stretchable fiber varieties, based on variety or amount of the elastic or reversibly stretchable fiber variety. In other words, it can be provided according to the present invention that, for example, identical elastic fiber varieties be used in relation to the first textile sheet material and the second textile sheet material, while the textile fibers are different—illustratively and non-limitingly a natural fiber, in particular a cotton fiber, in relation to the first textile sheet material and a synthetic fiber, in particular polyamide (PA), in relation to the second textile sheet material. The corresponding amounts can similarly differ from each other or else be identical. In this way it is possible according to the present invention for the respective textile sheet materials to be individually adapted. In this regard, for example, the first textile sheet material, which in the donned state is in direct contact with the skin of the wearer, can be finished to be particularly skin friendly or have a pleasant feel to the wearer, while for example the second textile sheet material, which in the donned state is on the side remote from the body or skin, is endowed with high chemical resistance. But it is similarly possible in the realm of the present invention for the first textile sheet material and the second textile sheet material to include identical fiber varieties.

As further regards the adsorption filter material according to the invention, the sorbent particles used for the adsorption layer can be secured to the first textile sheet material and/or to the second textile sheet material by means of an adhesive, in which case in particular the adhesive is applied discontinuously and/or dotwise to the first textile sheet material and/or to the second textile sheet material. In this regard, the adhesive can be applied to the first textile sheet material and/or to the second textile sheet material in an add-on amount of 2 to 40 g/m$^2$. Furthermore, the adhesive can cover the first textile sheet material and/or the second textile sheet material to an extent of at most 70%, in particular at most 60%, preferably at most 50%, more preferably at most 40% and even more preferably at most 30%. The types of adhesive used in this regard, which can be for example reactive, particular isocyanate-reactive, adhesives but also hot-melt adhesives, are well-known to a person skilled in the art, no that no further exposition is needed in this regard. The discontinuous or dotwise application of the adhesive ensures high breathability or air perviousness for the adsorption filter material of the present invention coupled with high stability on the pail of the resulting composite of layers.

This is because it can be provided in the realm of the present invention that the second textile sheet material is bonded, in particular adhered, to the first textile sheet material and/or to the sorbent particles of the adsorption layer such that a firm bond results. In this regard, the adhesive can be applied such that the sorbent particles are as it were both-sidedly bonded to the textile sheet materials, in which case the application of adhesive, or the adhering, should be effected such that a certain surficial portion of the sorbent particles is not covered by adhesive, ensuring good contact with the ambient air for effective adsorption of toxic substances. In this regard, at least 25%, in particular at least 30%, preferably at least 40% and more preferably at least 50% of the surface area of the sorbent particles should be freely accessible (i.e., not covered with adhesive) to the toxic substances to be adsorbed. This ensures that the adsorption capacity of the sorbent particles is utilized as substantially as possible.

As stated above, the adsorption filter material of the present invention should be gas pervious, in particular air pervious. In this regard, the gas or air transmission rate of the adsorption filter material should be 40 to 250 $l \cdot m^{-2} \cdot s^-$, in particular at least 50 $l \cdot m^{-2} \cdot s^{-1}$, preferably at least more preferably at least 100 $l \cdot m^{-2} \cdot s^{-1}$ and/or up to 1000 $l \cdot m^{-2} \cdot s^{-1}$ at a flow resistance of 127 Pa.

To ensure good wearing comfort, the adsorption filter material of the present invention and preferably the entire garment has, at 25° C., a water vapor transmission rate (WVTR) of at least 25 l/m² per 24 h, in particular at least 30 l/m² per 24 h, preferably at least 50 l/m² per 24 h or more. The water vapor transmission rate can be measured in particular by the inverted cup method of ASTM E 96 and at 25° C. For further details concerning the measurement of water vapor transmission rate reference may be made for example to McCoullough et al. "*A comparison of standard methods for measuring water vapour permeability of fabrics*" in: *Meas. Sci, Technol. [Measurements Science and Technology]* 14, pages 1402 to 1408 (August 2003).

Furthermore, to ensure high wearing comfort, the adsorption filter material of the present invention should have a water vapor transmission resistance $R_{et}$ under steady-state conditions, measured to DIN EN 31 092: 1993 (February 1994) and/or ISO 11 092, at 35° C., of at most 20 (m²·pascal)/watt, in particular at most 10 (m²·pascal)/watt, preferably at most 5 (m²·pascal)/watt.

The flexural strength of the adsorption filter material of the present invention should be at most 800 mg·cm, in particular at most 600 mg·cm, preferably at most 400 mg·cm, in at least one direction, preferably in the longitudinal and transverse directions. Owing to its relatively low flexural strength, the material is highly flexible and responds very well to shape changes, for example in the course of physical activity on the part of the wearer, which further improves the wearing comfort as a whole. The flexural strength herein is determined in accordance with ASTM D-1388.

As regards further properties of the adsorption filter material of the present invention, it can have a bursting pressure, determined to ISO 13938-2, of at least 100 kPa, in particular at least 130 kPa, preferably at least 150 kPa, more preferably at least 0.170 kPa, so that the material as a whole possesses high mechanical stability and thus is not destroyed under severe physical stress, for example in the course of a battlefield deployment.

In addition, the adsorption filter material of the present invention should have an elastic stretch in at least one direction, preferably in the longitudinal and transverse directions, of at least 10%, in particular at least 15%, preferably at least 20%, more preferably at least 25%, even more preferably at least 30% and most preferably at least 35%, at 20 N and based on the adsorption filter material (i.e., based on its original dimensions). Elastic stretch can herein be determined on the basis of DIN 53835-14. As mentioned above, the high elasticity or elastic stretch or reversible stretch has the consequence that the adsorption filter material of the present invention conforms particularly good to the shape of the body of the wearer and thus fits closely to the skin.

To ensure adequate stability, the adsorption filter material of the present invention should have adequate thickness. The applicant has found that particularly good stability values result when the adsorption filter material of the present invention has an overall thickness of more than 1.0 mm, in particular at least 1.05 mm, preferably at least 1.1 mm. The adsorption filter material of the present invention can in this connection have an overall thickness of up to 1.5 mm.

The first textile sheet material and/or the second textile sheet material, preferably the first textile sheet material, which in the donned state is next to the skin of the wearer, can in accordance with an embodiment which is preferred according to the present invention be coated or impregnated with a bacteriostatic and/or bacteriocidal composition, in particular with a silver-containing compound and/or silver. In this regard, the amount of the composition can be 0.0001% to 10% by weight, in particular 0.001% to 5% by weight, preferably 0.01% to 1% by weight, based on the respective textile material. Similarly, however, the second textile sheet material can also be coated with a bacteriostatic and/or bacteriocidal composition. In this regard, additional protection against biological warfare agent materials, such as noxiant microorganisms for example, can be provided in particular. In addition, the bacteriostatic or bacteriocidal coating or impregnation reduces bacterial growth per se, so that the adsorption filter material of the present invention can be worn for longer periods, since it stays fresh longer.

In addition, it can be provided according to the present invention that the first textile sheet material and/or the second textile sheet material, preferably the first textile sheet material, which in the donned state is on the side next to the skin of the wearer, are hydrophilicized and/or water imbibing; this has the advantage that perspiration formed by the body can be imbibed and transported away. A specific impregnation can be used in this regard. Similarly, the first textile sheet material and/or the second textile sheet material, preferably the second textile sheet material, can be finished with flameproofing. It can similarly be possible for the first textile sheet material and/or the second textile sheet material, preferably the second textile sheet material, to be finished to be antistatic. In accordance with a further embodiment of the present invention, the first textile sheet material and/or the second textile sheet material, preferably the second textile sheet material, can be finished to have infrared reflection properties. Owing to the specific finishing of the layers, an individual adaptation of the adsorption filter material of the present invention in relation to the particular conditions of employment can be ensured. The adsorption filter material of the present invention can so to speak be custom tailored to the particular condition of deployment.

The sorbent particles used according to the present invention comprise or consist of in particular discrete activated carbon particles, preferably in grain form ("granutocarbon") or spherical form ("spherocarbon").

In this regard, the median diameter of the sorbent particles, in particular of the activated carbon particles, is 0.01 to 2 mm, preferably 0.05 to 1 mm and more preferably 0.1 to 0.5 mm.

Advantageously, the sorbent particles, in particular the activated carbon particles, are used in an amount of 40 to 250 g/m$^2$, in particular 50 to 180 g/m$^2$, preferably 55 to 130 g/m$^2$.

Activated carbon particles preferably used according to the present invention are generally abrasion resistant. Advantageously, the bursting pressure of an activated carbon particle is 5 N, in particular at least 10 N. Preferably, the bursting pressure of an individual activated carbon granule, in particular activated carbon spherule, is in the range from 5 to 20 N. This provides an adsorption filter material of the present invention in which the activated carbon is present in a mechanically resistant form. Such abrasion-resistant activated carbon is obtainable in particular by carbonization and subsequent activation of suitable polymer starting spherules, preferably based on divinylbenzene-crosslinked styrenes. Consequently, the activated carbon grains used do not, even under mechanical load, tend to burst or form dust (no activated carbon dust). In particular, the activated carbon grains used are free of dust, in particular free of pulverulent activated carbon.

Consequently, the activated carbon grains used do not, even under mechanical load, tend to burst or form dust (no activated carbon dust). In particular, the activated carbon grains used are free of dust, in particular free of pulverulent activated carbon.

To ensure high performance capability on the part of the adsorption filter material of the present invention, it is advantageous when the activated carbon used has a specific surface area (BET) of at least 500 m$^2$/g, in particular at least 750 m$^2$/g, preferably at least 1000 m$^2$/g, more preferably at least 1200 m$^2$/g. In general, the activated carbon used according to the present invention has a specific surface area (BET) in the range from 500 to 2500 m$^2$/g, in particular 750 to 2250 m$^2$/g, preferably 900 to 2000 m$^2$/g, more preferably 1000 to 1750 m$^2$/g. The BET method can be reviewed for example by referring to Römpp Chemietexikon, 10th edition, Georg Thieme Verlag Stuttgart/New York, headword: "BET-Methode", and also the references cited therein, in particular Winnacker-Küchler, 3rd edition, volume 7, pages 93 ff, and also Z. Annal. Chem. 238, pages 187 to 193 (1968).

To provide high efficiency to the adsorption filter material of the present invention, it is preferable when the activated carbon used is an activated carbon having an adsorption volume $V_{ads}$ of at least 250 cm$^3$/g, in particular at least 300 cm$^3$/g, preferably at least 350 cm$^3$/g, more preferably at least 400 cm$^3$/g. In general, an activated carbon is used with an absorption volume $V_{ads}$ of 250 to 1000 cm$^3$/g, in particular 300 to 900 cm$^3$/g, preferably 350 to 750 cm$^3$/g.

Preference according to the present invention is given to an activated carbon having a Gurvich total pore volume of at least 0.50 cm$^3$/g, in particular at least 0.55 cm/g, preferably at least 0.60 cm/g, more preferably at least 0.65 cm/g, most preferably at least 0.70 cm$^3$/g. In general, an activated carbon is used with a Gurvich total pore volume of 0.50 to 0.90 cm/g, in particular 0.55 to 0.85 cm$^3$/g, preferably 0.60 to 0.80 cm$^3$/g, more preferably 0.65 to 0.80 cm$^3$/g, most preferably 0.70 to 0.75 cm$^3$/g. Further details concerning the determination of the Gurvich total pore volume can be reviewed by referring for example to L. Gurvich, (1915), J. Phys. Chem. Soc. Russ. 47, 805 and also to S. Lowell et al., Characterization of Porous Solids and Powders: Surface Area, Pore Size and Density, Kluwer Academic Publishers, Article Technology Series, pages 111 ff.

The applicant has found that in particular an activated carbon having a large micropore volume fraction, based on the total pore volume of the activated carbon, is suitable. In the realm of the present invention, the term micropore volume is to be understood as referring in particular to that pore volume of the activated carbon which is provided by pores having a diameter of ≦25 Å (2.5 nm), in particular ≦20 Å (2.0 nm).

This is because the applicant has found that, surprisingly, the concentrations of noxiant and/or odorant materials are reduced particularly efficiently when the micropore volume fraction of the activated carbon used is particularly high. Without wishing to be bound by any particular theory, it is believed that the particularly good efficiency achieved with an activated carbon having a particularly large micropore volume fraction can be attributed to the fact that the micropores are by virtue of their but small size capable of entering into interaction with the molecules to be sorbed or adsorbed, from all sides or walls, so to speak. In particular, an activated carbon is used which has a micropore volume fraction, based on the total, pore volume of the activated carbon, of at least 60%, in particular at least 65%, preferably at least 70%.

In particular, it is preferable according to the present invention to use an activated carbon having a micropore volume fraction formed from pores having pore diameters of 25 Å, preferably ≦20 Å, of at least 60%, in particular at least 65% and preferably at least 70%, based on the total pore volume.

An activated carbon which is preferably used according to the present invention has a micropore volume, i.e., a micropore volume formed from pores having pore diameters of ≦25 Å, preferably ≦20 Å, as determined by the carbon black method of at least 0.40 cm$^3$/g, in particular at least 0.45 cm$^3$/g, preferably at least 0.50 cm$^3$/g, In general, this micropore volume as determined by the carbon black method is in the range from 0.40 to 0.80 cm$^3$/g, in particular 0.45 to 0.75 cm$^3$/g, preferably 0.50 to 0.60 cm$^3$/g. Further details of the determination of the pore surface area by the carbon black method can be viewed by referring for example to R. W. Magee, Evaluation of the External Surface Area of Carbon Black by Nitrogene Adsorption, Presented at the Meeting of the Rubber Division of the American Chem, Soc., October 1994, cited for example in: Quantachrome Instrument, AUTOSORB-1 AS1 WinVersion 1.50, Operating Manual, P/N 05061, Quantochrome instruments 2004, Florida, USA, pages 71 ff.

Owing to the high microporosity of the activated carbon preferably used according to the present invention, this activated carbon similarly has a high specific micropore surface area fraction. The specific micropore surface area fraction, i.e., the surface area fraction attributable to pores having pore diameters of ≦25 Å, preferably ≦20 Å, is at least 70%, in particular at least 75%, preferably at least 80% and more preferably at least 85%, based on the specific total surface area (BET) of the activated carbon. In particular, this micropore surface area fraction is in the range from 70 to 95%, in particular 75 to 95%, preferably 80 to 90%.

The activated carbon preferably used according to the present invention has by virtue of its microporosity a large micropore surface area also. In particular, the micropore surface area as determined by the carbon black method (i.e., the micropore surface area formed from pores having pore diameters of ≦25 Å, preferably ≦20 Å) is at least 400 m$^2$/g, in particular at least 800 m$^2$/g, preferably at least 1000 m$^2$/g, more preferably at least 1200 m$^2$/g. In accordance with a preferred embodiment, this micropore surface area is in the range from 400 to 1750 m²/g, in particular 800 to 1500 m²/g, preferably 1000 to 1400 m²/g, more preferably 1100 to 1300 m²/g.

Preference according to the present invention is given to using a microporous activated carbon having a mean pore diameter (average pore diameter) of at most 35 Å, preferably at most 30 Å, more preferably at most 25 Å. In particular, this mean pore diameter is in the range from 15 to 35 Å, in particular 15 to 30 Å, preferably 15 to 25 Å.

As regards the density of the activated carbon preferably used according to the present invention, the raw density of the activated carbon used is generally in the range from 700 to 975 g/cm³, in particular 750 to 950 g/cm³, preferably 800 to 900 g/cm³. The poured bulk density of the activated carbon used, by contrast, is in the range from 300 to 900 g/cm³, in particular 350 to 800 g/cm³, preferably 400 to 750 g/cm³.

It is of advantage for particularly good efficiency when the activated carbon used has an overall porosity of 40 to 70%, in particular 45 to 65%, preferably 50 to 60%.

It is preferable according to the present invention when the activated carbon used has a specific total pore volume in the range from 0.1 to 2.5 cm³/g, in particular 0.2 to 2.0 cm³/g, preferably 0.3 to 1.5 cm³/g, more preferably 0.4 to 1.0 cm³/g. The proportion of pores having pore diameters of ≦36 Å is at least 65%, in particular at least 70% and preferably at least 75%, and can reach values of up to 95%, in particular up to 90%.

An activated carbon particularly useful according to the present invention in that it fulfils the aforementioned properties and specifications is marketed for example by Biticher GmbH, Erkrath, Germany, or by AdsorTech GmbH, Premnitz, Germany.

To enhance the adsorptive performance, activated carbon used according to the present invention can be provided with an impregnation. This is known as such to a person skilled in the art. Similarly, the activated carbon can be impregnated in this regard with a catalyst which is known per se to a person skilled in the art.

The present invention's adaptation of the adsorption filter material according to the present invention provides an excellent barrier effect with regard to chemical warfare agent materials. The barrier effect of the adsorption filter material with regard to chemical warfare agent materials, in particular bis [2-chloroethyl] sulfide (also known by the synonyms of mustard gas, HD or Yellow Cross), as measured to CRDEC-SP-84010, method 2.2, allows permeation of at most 4 μg/cm² per 24 h, in particular at most 3.5 μg/cm² per 24 h, preferably at most 3.0 μg/cm² per 24 h, more preferably at most 2.5 μg/cm² per 24 h.

Further advantages, properties and feature of the present invention will become apparent from the following description of a preferred illustrative embodiment depicted in the drawing, where the FIGURE shows a schematic sectional depiction through the layered construction of an inventive adsorption filter material in accordance with the preferred illustrative embodiment of the present invention corresponding to a specific embodiment.

The sole FIGURE shows a schematic sectional depiction through the layered construction of an inventive adsorption filter material 1 corresponding to a specific embodiment. The inventive adsorption filter material, which can be used in particular for NBC protective apparel, preferably for wearing next to the skin, in particular as an undergarment (underwear), has a multilayered construction comprising a first textile sheet material 2, a second textile sheet material 5 and an adsorption layer disposed between the first and second textile sheet materials 2, the adsorption layer including discrete, in particular granular, preferably spherical sorbent particles 3, preferably based on activated carbon, which adsorb chemical and/or biological poison and noxiant materials, in particular warfare agent materials. The inventive adsorption material 1 is notable in that the first textile sheet material 2 and the second textile sheet material 5 are each constructed to be elastic in at least one direction, preferably in both directions.

The FIGURE further shows that the sorbent particles 3 are adhered to the first textile sheet material 2 and to the second textile sheet material 5 by means of an adhesive 4. Similarly, the FIGURE shows an inventive embodiment whereby the second textile sheet material 5 is bonded to the first textile sheet material 2 via dots or bridges 4" of adhesive.

The present invention provides—in accordance with a second aspect of the present invention—an inventive garment, in particular NBC protective apparel, preferably for wearing next to the skin, in particular as an undergarment (underwear), including an adsorption filter material in particular as defined above, and/or obtained using an adsorption filter material, in particular as defined above. For further details in relation to the garment of the present invention reference may be made to the above embodiments relating to the adsorption filter material of the present invention, which apply mutatis mutandis with regard to the garment of the present invention.

The present invention also provides—in accordance with a third aspect of the present invention—for the use of the adsorption filter material according to the invention, in particular as defined above, in the manufacture of garments, in particular NBC protective apparel, preferably for wearing next to the skin, in particular as an undergarment (underwear). For further details in relation to the use according to the present invention, reference can be made to the above observations relating to the adsorption filter material of the present invention, which apply mutatis mutandis with regard to the use according to the present invention.

The adsorption filter material of the present invention and the garments obtained therefrom, in particular in the form of protective apparel providing protective performance with regard to chemical poison or warfare agent materials, are associated with numerous advantages:

- The specific construction of the adsorption filter material of the present invention, in the form of a sandwich of preferably mono- or bi-elastic knit fabrics having a layer of lightweight sorbent particles, in particular lightweight but highly reactive nano- or microporous activated carbon particles, positioned between these layers or plies, results in a high elasticity or reversible stretchability on the part of the adsorption filter material of the present invention, which provides a good wearing physiology while at the same time ensuring high protection against chemical or biological poison or warfare agent materials.
- The adsorption filter material of the present invention can be processed into a protective apparel which can be worn directly—like a second skin—on the body. The high elasticity ensures that the protective apparel obtained from the adsorption filter material of the present invention lies directly on the skin, so that intermediate spaces between the protective apparel and the skin are substantially avoided, which further improves both the wearing comfort and the protective performance, since the above-described bellows or bellowing effect is minimized even when physical activity is vigorous,
- The gas perviousness, in particular air perviousness, and/or water vapor perviousness on the part of the adsorption filter material of the present invention makes it possible to still further enhance the wearing comfort since, for example, perspiration can be effectively transported away from the wearer, The adsorption filter material of the present invention has high physical and chemical stability, not least due to the specific selection of fibers which are stable in these regards.

The specific layered structure makes it possible for the respective textile sheet materials to have the same construction or to be constructed differently from each other, so that the individual layers can be individually adapted or custom tailored to the particular performance profile required. The layer which is next to the skin in the donned state or the corresponding textile sheet material can be made particularly skin-friendly, whereas for example the layer which is remote from the skin in the donned state or the corresponding textile sheet material can be finished to have an additional protective function in relation to toxic substances.

Altogether, the adsorption filter material of the present invention comprises a lightweight, in particular air-pervious, soft and elastic material which has an improved wearing physiology and can be used for underwear, in particular NBC protective underwear, wearable directly next to the skin, it is the specific selection of materials which leads to the lightweight, soft and elastic design and to the reduced weight, and this altogether results in a distinct improvement in wearing physiology or comfort.

Further elaborations, modifications and variations of the present invention will become apparent to and realizable by the ordinarily skilled on reading the description without their having to go outside the realm of the present invention.

The present invention will now be illuminated with reference to illustrative embodiments which, however, do not limit the present invention in any way.

Illustrative Embodiments:

Four different samples of adsorption filter materials are investigated, namely two inventive embodiments and also two comparative adsorption filter materials. All the adsorption filter materials have a comparable layered construction of inner layer (first textile sheet material), adsorption layer based on activated carbon, and outer layer (second textile sheet material).

a) EXAMPLE 1 (INVENTIVE)

An absorption filter material comprising the first textile sheet material (carrier) in the form of a knit fabric based on DOW XLA® fibers as elastic fiber variety and cotton (CO) fibers as further fiber variety is produced. The ratio between CO fibers and DOW XLA® fibers is 88/12. The basis weight of the first textile sheet material is 120 g/m². The adhesive used between the first textile sheet material and the adsorption layer based on nano- or microporous activated carbon is a copolyamide adhesive at 10 g/m². The nano- or microporous carbon is used at 120 g/m². The adhesive used between the adsorption layer and the second textile sheet material is a polyurethane-reactive hot-melt adhesive at 35 g/m². The covering used (second textile sheet material) is a knit fabric based on polyamide (PA) fibers and DOW XLA® fibers and having a basis weight of 120 g/m². The ratio between PA fibers and DOW XLA® fibers is 82/18. The properties of the absorption filter material are shown in table 1:

TABLE 1

| Test | Method | Unit | Value |
|---|---|---|---|
| Weight | ASTM D 3773 | g/m² | 405 +/− 20 |
| Thickness | ASTM D 1777-64 | mm | max. 1.2 |
| Air transmission rate | ASTM D 737-96 | l/m²s | min. 80 |
| Bursting pressure | ISO 13938-2 | kPa | min. 130 |
| Elastic stretchability at 20 N | DIN 53835-14 | Length/width % | min. 15/35 |
| Flexural stiffness | ASTM D-1388 | Length/width mg · cm | max. 800/600 |
| Shrinkage on washing | ATTCC 135 | Length/width % | 5/5 |

The nano- or microporous activated carbon used has a micropore fraction of at least 60%, The inventive adsorption filter material of example 1 combines excellent elasticity and low flexural stiffness with a high bursting pressure. In addition, the inventive material has a very good air transmission rate. The inventive adsorption filter material of example 1 is useful in the manufacture of underwear for example.

b) EXAMPLE 2 (INVENTIVE)

A further inventive adsorption filter material is made and tested. The inventive adsorption filter material has a carrier layer (first textile sheet triaterial) based on a knit fabric comprising CO fibers and DOW XLA® fibers in a ratio of 88/12 at a basis weight of 110 g/m². In addition, the carrier layer includes an antibacterial silver finish based on a silver-containing compound. The adhesive used for the bond between the carrier layer and the adsorption layer is a polyurethane-reactive adhesive at 35 g/m². The adsorption layer consists of nano- or micro. 15 porous activated carbon at 120 g/m². A copolyamide adhesive is used at 10 g/m² between the adsorption layer and the covering (second textile sheet material). The covering (second textile sheet material) is an elastic knit fabric having an antibacterial silver coating, the covering including CO fibers and DOW XLA® fibers in a ratio of 88/12, The properties of the adsorption filter material are shown in table 2:

TABLE 2

| Test | Method | Unit | Value |
|---|---|---|---|
| Weight | ASTM D 3773 | g/m² | 385 +/− 20 |
| Thickness | ASTM D 1777-64 | mm | max. 1.2 |
| Air transmission rate | ASTM D 737-96 | l/m²s | min. 120 |
| Bursting pressure | ISO 13938-2 | kPa | min. 130 |
| Elastic stretchability at 20 N | DIN 53835-14 | Length/width % | min. 10/25 |
| Flexural stiffness | ASTM D-1388 | Length/width mg · cm | max. 800/600 |

The nano- or microporous activated carbon used has a micropore fraction of at least 60%.

Thus, the inventive adsorption filter material of example 2 likewise displays excellent properties with regard to elasticity, flexural stiffness, air transmission rate and bursting pressure. In addition, microbiological tests showed the inventive adsorption filter material of example 2 to have reduced bacterial growth on or in the material. Inventive example 2 is useful in the manufacture of (under-)gloves for example.

c) EXAMPLE 3 (COMPARATIVE)

A noninventive adsorption filter material is made without the use of elastic sheet materials. In addition, an activated carbon having a microporosity of less than 40% is used. The stretchability properties of the material are distinctly inferior compared with the inventive examples and, moreover, flexural stiffness increases distinctly. Finally, the bursting pressure is also dimtinctly reduced. As a result, the material of example 3 is less flexible or less elastic and is faster to rupture under mechanical load and the activated carbon is faster to detach under a stretching load.

d) EXAMPLE 4 (COMPARATIVE EXAMPLE)

An adsorption filter material is made in a construction comparable to example 1 but with polyuretharte fibers substituted for the elastic fibers. The adsorption filter material of example 4 has inferior values to the inventive examples with regard to elasticity, flexural stiffness and also bursting pressure. Chemical stability, in particular with regard to warfare agent materials, is distinctly worse than in the case of the inventive adsorption filter material; as will be described below, the polyurethane fibers disintegrate or become damaged under the action of chemicals, in particular warfare agent materials.

The excellent properties of the inventive adsorption filter material of examples 1 and 2 compared with products of the prior art are confirmed in further tests conducted:

1. Barrier Effect with Regard to Chemical Warfare Agent Materials a) A first series of tests is carried out with regard to the barrier effect with regard to bis[2-chloroethyl] sulfide (also referred to synonymously as mustard gas, HD or Yellow Cross, measured to CRDEC-SP-84010, method 2.2, for the inventive adsorption filter material of example 1 and comparative example 3, Whereas a barrier effect allowing permeation of less than 2.5 $\mu g/cm^2$ per 24 h results for the inventive adsorption filter material, comparative example 3 has a somewhat worse value of about 3.5 $\mu g/cm^2$ per 24 h.

b) in a further, independent test, the barrier effect of the inventive adsorption filter material of example 1 is compared with a further comparative example comprising an adsorption filter material as described in US 2003/0229936 A1, In this regard, an activated carbon knit is used in regard of the adsorption layer, in accordance with US 2003/0229936 A1. The barrier effect of the materials produced is determined in a first step. Both the materials initially afford good protection or barrier performance with regard to mustard gas as per the test to GRDEC-SP-84010, method 2.2. White the inventive adsorption filter material of example 1 gives a barrier effect allowing permeation of less than 2.5 $\mu g/cm^2$ per 24 h, a value of 6.0 $\mu g/cm^2$ per 24 h results for the comparative example including the activated carbon knit.

Thereafter, the corresponding adsorption filter materials as per inventive example 1 and the above-described comparative example as per US 2003/0229936 A1, comprising an activated carbon knit, are subjected to a severe mechanical stress. In this regard, the adsorption filter materials are repeatedly elastically stretched, both in the transverse direction and in the longitudinal direction, using an acting tensile force of 10 N, Subsequently, the materials are additionally inflated 10 times in the manner of the above-indicated method of determining the bursting pressure, the inflating pressure being 60 kPa in this regard. Subsequently, the adsorption filter materials thus treated are re-tested for their barrier effect, While the inventive adsorption filter material of example 1 again gives an excellent value of less than 2.5 $\mu g/cm^2$ per 24 h, the comparative example as per US 2003/0229936 A1, including the activated carbon knit, gives distinctly worse values in this regard, of more than 10 per 24 It Visual inspection of the material also shows that the activated carbon knit displays distinct signs of damage.

2. Stability to chemicals: In a further series of tests, the stability to sodium hypochlorite is tested for inventive example 1 in comparison with comparative example 4, which contains polyurethane fibers, To this end, the corresponding adsorption filter materials are exposed to a solution containing 2 g/l of sodium hypochlorite at a of 10. The materials are exposed to the solution at 0° C. for a period of 24 h. After exposure and drying, the materials are subjected to a bursting pressure test to ISO 13938-2. While a reduction in bursting pressure of only about 10% is determined for the inventive material of example 1, the noninventive material of example 4 shows a distinct reduction in bursting pressure, of more than 60%. In this regard, a distinct deterioration, in particular a degradation of the fibers, can already be seen by visual inspection of the material as per example 4.

The preceding tests illustrate that the inventive adsorption filter material has a distinctly improved performance capability not only with regard to protection against chemical warfare agent materials but also with regard to elasticity. The tests also illustrate that the adsorption filter materials of the invention can achieve enhanced performance through the use of highmicroporosity activated carbon.

The invention claimed is:

1. Air pervious adsorption filter material for NBC protective apparel for wearing next to the skin,
    wherein the adsorption filter material has a multilayered construction, wherein the multilayered construction comprises:
        a first air pervious textile sheet material,
        a second air pervious textile sheet material and
        an adsorption layer disposed between the first and the second textile sheet materials,
        wherein the adsorption layer includes discrete sorbent particles based on activated carbon, the sorbent particles adsorbing chemical or biological poison and noxiant materials and the sorbent particles being in the form of activated carbon particles in grain form or spherical form,
        wherein the sorbent particles are secured to at least one of the first textile sheet material and to the second textile sheet material by means of an adhesive,
        wherein the adhesive is applied discontinuously to at least one of the first textile sheet material and the second textile sheet material,
        wherein the second textile sheet material is bonded to at least one of the first textile sheet material and the sorbent particles such that a firm bond results;
    wherein the first textile sheet material and the second textile sheet material are each constructed to be elastic in at least one direction and have at least essentially the same elasticity properties;
        wherein at least one of the first textile sheet material and the second textile sheet material comprises a mixture of at least two different fiber varieties, wherein at least one of the first textile sheet material and the second textile sheet material comprises at least one elastic or reversibly stretchable fiber variety:
        wherein the fiber variety is physically and chemically stable;
        wherein the fiber variety is a fiber variety other than polyurethane fibers and is selected from polyolefin fibers and polyester fibers; and wherein the adsorption filter material has an elastic stretch in at least one direction of at least 10 % at 20 N, based on the adsorption filter material.

2. The adsorption filter material according to claim 1, wherein at least one of the first textile sheet material and the second textile sheet material is constructed as a woven, a knit, a laid scrim or a bonded fabric.

3. The adsorption filter material according to claim 1, wherein at least one of the first textile sheet material and the second textile sheet material includes an elastic or reversibly stretchable fiber variety in an amount of 5% to 30% by weight, based on the respective textile sheet material.

4. The adsorption filter material according to claim 1, wherein at least one of the first textile sheet material and the second textile sheet material as well as the elastic or reversibly stretchable fiber variety include at least one further fiber variety selected from textile fibers.

5. The adsorption filter material according to claim 1, wherein the adhesive is applied to at least one of the first textile sheet material and the second textile sheet material in an add-on amount of 20 to 40 mg/m$^2$, and wherein the adhesive covers at least one of the first textile sheet material and the second textile sheet material to an extent of at most 70% each.

6. The adsorption filter material according to claim 1, wherein the gas or air transmission rate of the adsorption filter material is at least 50 l·m$^{-2}$·s$^{-1}$ and up to 1000 l·m$^{-2}$·s$^{-1}$ at a flow resistance of 127 Pa.

7. The adsorption filter material according to claim 1, wherein the adsorption filter material has an elastic stretch in at least one direction of at least 15% at 20 N and based on the adsorption filter material.

8. The adsorption filter material according to claim 1, wherein the median diameter of the sorbent particles is 0.01 to 2 mm.

9. The adsorption filter material according to claim 1, wherein the activated carbon is an activated carbon having a micropore volume fraction, based on the total pore volume of the activated carbon, of at least 60%.

10. Garment in the form of NBC protective apparel for wearing next to the skin, the garment comprising an adsorption filter material of claim 1.

11. The garment of claim 10, wherein the garment is an undergarment or a piece of underwear.

12. Air pervious adsorption filter material for NBC protective apparel for wearing next to the skin,
wherein the adsorption filter material has a multilayered construction, wherein the multilayered construction comprises:
a first air pervious textile sheet material,
a second air pervious textile sheet material and
an adsorption layer disposed between the first and the second textile sheet materials,
wherein the adsorption layer includes discrete sorbent particles based on activated carbon, the sorbent particles adsorbing chemical or biological poison and noxiant materials and the sorbent particles being in the form of activated carbon particles in grain form or spherical form,
wherein the sorbent particles are secured to at least one of the first textile sheet material and to the second textile sheet material by means of an adhesive,
wherein the adhesive is applied discontinuously to at least one of the first textile sheet material and the second textile sheet material,
wherein the second textile sheet material is bonded to at least one of the first textile sheet material and the sorbent particles such that a firm bond results;
wherein the first textile sheet material and the second textile sheet material are each constructed to be elastic in at least one direction and have at least essentially the same elasticity properties;
wherein at least one of the first textile sheet material and the second textile sheet material comprises a mixture of at least two different fiber varieties, wherein at least one of the first textile sheet material and the second textile sheet material comprises at least one elastic or reversibly stretchable fiber variety:
wherein the fiber variety is physically and chemically stable;
wherein the fiber variety is a fiber variety other than polyurethane; and
wherein the adsorption filter material has an elastic stretch in at least one direction of at least 10% at 20 N, based on the adsorption filter material.

13. Air pervious adsorption filter material for NBC protective apparel for wearing next to the skin,
wherein the adsorption filter material has a multilayered construction, wherein the multilayered construction comprises:
a first air pervious textile sheet material,
a second air pervious textile sheet material and
an adsorption layer disposed between the first and the second textile sheet materials,
wherein the adsorption layer includes discrete sorbent particles based on activated carbon, the sorbent particles adsorbing chemical or biological poison and noxiant materials and the sorbent particles being in the form of activated carbon particles in grain form or spherical form,
wherein the sorbent particles are secured to at least one of the first textile sheet material and to the second textile sheet material by means of an adhesive,
wherein the adhesive is applied discontinuously to at least one of the first textile sheet material and the second textile sheet material,
wherein the second textile sheet material is bonded to at least one of the first textile sheet material and the sorbent particles such that a firm bond results;
wherein the first textile sheet material and the second textile sheet material are each constructed to be elastic in at least one direction and have at least essentially the same elasticity properties; and
wherein the adsorption filter material has an elastic stretch in at least one direction of at least 10% at 20 N, based on the adsorption filter material.

* * * * *